Aug. 11, 1942.                P. K. DEVERS                2,292,826
                       APPARATUS FOR FUSING SILICA
                        Filed Oct. 21, 1939        2 Sheets-Sheet 1
Fig. 1.
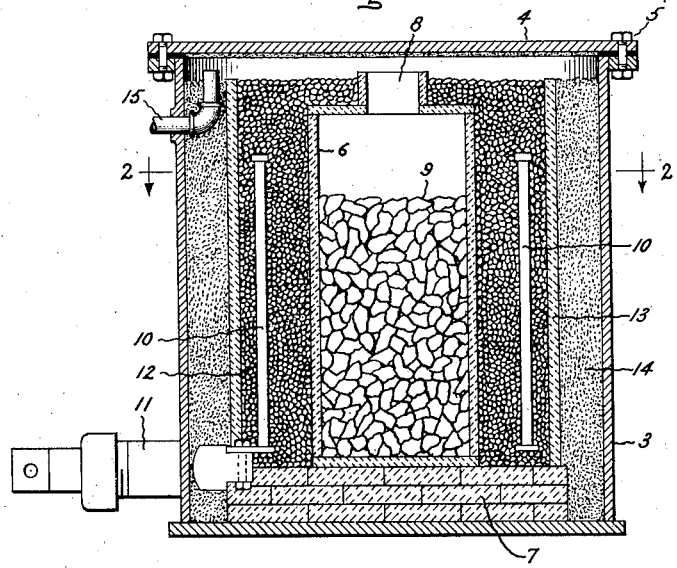
Fig. 2.
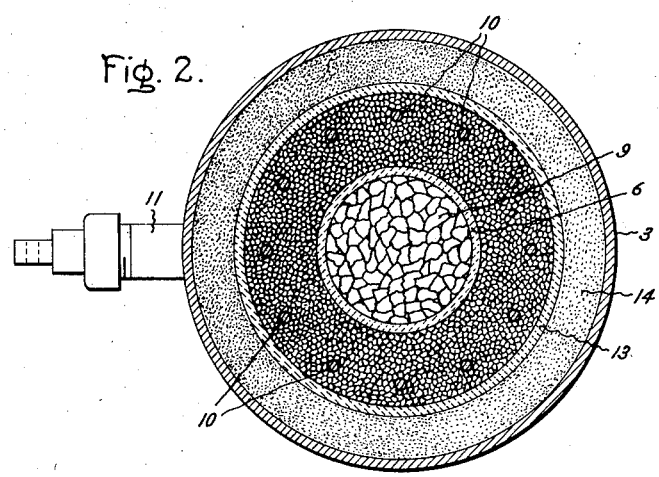
Fig. 6.       Fig. 7.
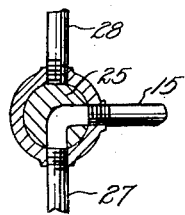   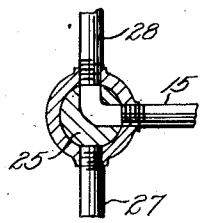
Inventor:
Philip K. Devers,
by Harry E. Dunham
His Attorney.

Aug. 11, 1942.                P. K. DEVERS                2,292,826
                       APPARATUS FOR FUSING SILICA
                          Filed Oct. 21, 1939        2 Sheets-Sheet 2
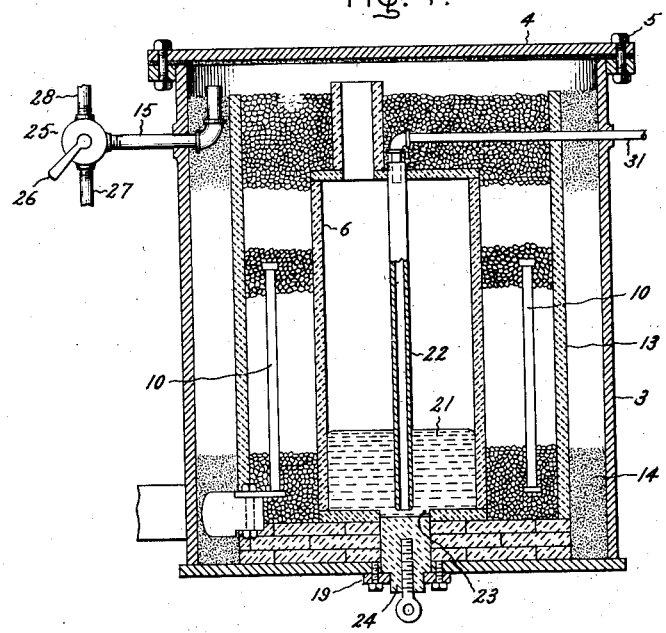
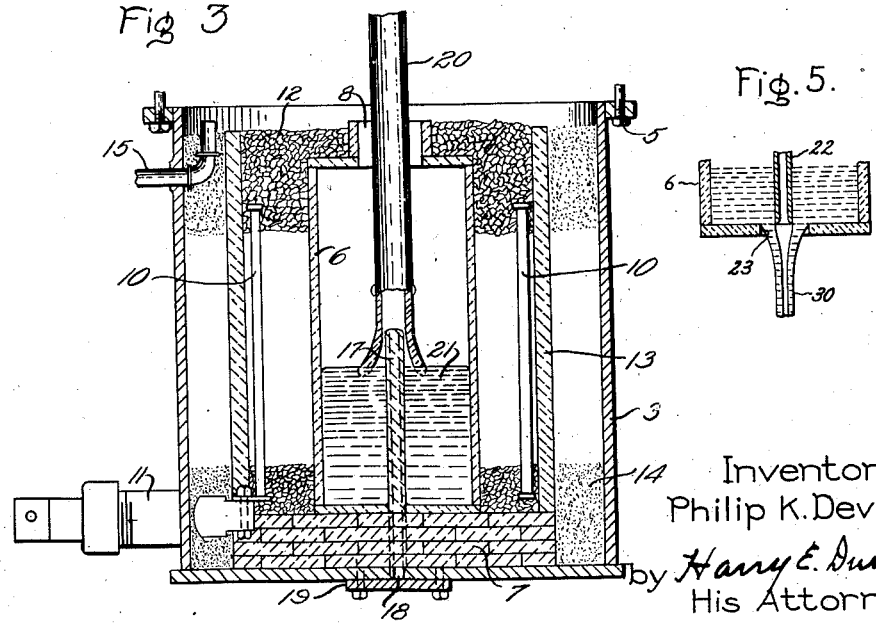
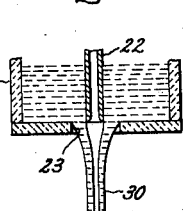
Inventor:
Philip K. Devers,
by Harry E. Dunham
His Attorney.

Patented Aug. 11, 1942

2,292,826

UNITED STATES PATENT OFFICE 2,292,826

APPARATUS FOR FUSING SILICA

Philip K. Devers, Lynn, Mass., assignor to General Electric Company, a corporation of New York Application October 21, 1939, Serial No. 300,653

4 Claims. (Cl. 49—17.1)

The present invention has for its object the fusion of silica and, in particular, the production of improved vitreous silica resulting from the fusion of crystalline silica.

When crystalline silica or quartz is heated to temperatures approximating fusion, it first disintegrates into many fragments. As these fragments coalesce by fusion under ordinary conditions, a mass of vitreous silica results containing many gas bubbles. In the commercial fusion of quartz the trapping of gas is reduced to a minimum by carrying out the fusion in an evacuated space. The fusion ordinarily has been carried out in a carbonaceous container suitably heated in an evacuated furnace as silica under these conditions appeared to be substantially inert to carbon at the fusion temperature. In some cases the silica to be fused has been supported by a surrounding mass of silica which remained unfused. In either case the heat required for fusion has been furnished by carbonaceous electric resistance heaters which were surrounded by silica granules. Such an arrangement is shown in my prior United States Patent No. 1,862,358.

Although "fused quartz" or vitreous silica of good quality has been produced by such practice, close optical examination of the product shows, by the presence of striae and double refractions, that the product is not entirely homogeneous. Carbon, or carbon monoxide, which is formed by oxidation of the carbon, appears to have some chemical effect on a surface layer of the silica which is not apparent to the unaided eye. Vapor discharge lamps fashioned from such non-homogeneous vitreous silica are subject to failure by devitrification during their operation which entails heating of the silica envelope to high temperatures.

I have discovered that vitreous silica (fused quartz) of better quality, that is, substantially free from such defects, can be made by carrying out the fusion of silica in a container of chemically inert refractory oxide, such for example as zirconia or beryllia. Unexpectedly, contact of silica with such refractory oxide, even at the high temperatures required for fusion—which approximates 1800° C., does not result in chemical modification of the silica. Lamp tubes of homogeneous silica fused in such an environment have a materially longer life, that is, devitrification of the silica at high temperatures is materially delayed.

My invention comprises an apparatus for converting silica from the crystalline to the vitreous state by fusion carried out in a vacuum while the silica to be fused is supported by a closely circumjacent packing of zirconia or equivalent inert refractory material which is self-sustaining at the fusion temperature of silica, and has sufficient porosity to permit of the flow of gases therethrough. The apparatus or furnace includes a crucible or other support of zirconia, beryllia, or other suitable non-metallic refractory material in addition to suitable heating means, with or without other adjuncts such as evacuating means and provision for shaping the fused silica as by drawing or extrusion.

My invention will be described in greater detail in connection with the accompanying drawings in which Fig. 1 is a vertical section of a silica fusion apparatus; Fig. 2 is a cross-section of such apparatus; Fig. 3 is a vertical section of a modification illustrating the production of tubing; Fig. 4 is a vertical section of another modification; Fig. 5 is a cross-sectional detail view illustrating the production of tubing by the apparatus shown in Fig. 4, and Figs. 6 and 7 are detail views of valve mechanisms.

Referring to Figs. 1 and 2, the fusion apparatus, or furnace, illustrated comprises a metal housing 3 which is provided with a removable cover 4. The cover may be fastened in vacuum-tight relation to the side walls of the housing 3 by the bolts 5, appropriate packing material being inserted as illustrated. A crucible 6 as shown is made up of several parts mechanically fitted together and preferably consisting of zirconia or the like, is provided within the furnace. It rests on a support 7 of firebrick or the like. The crucible 6 and a charge 9 of silica fragments or silica powder are heated by the incandescence of a carbon resistance heater 10 which consists of a plurality of rods connected in series and connected to electric terminals 11. The heater is spaced from the crucible 6 and is screened therefrom by being embedded in a packing 12 of fragments of zirconia, beryllia, or other oxide which is chemically attacked only superficially by carbon at a temperature of about 1800 to 2000° C. The porosity of this packing, which does not coalesce or soften at the fusion temperature of silica, renders it pervious to gases and hence provides for the ready escape and exhaust of gases which may be evolved. The packing 12, which closely surrounds the crucible in turn is surrounded and supported by an enclosure 13 of suitable refractory material, such as alundum or zircon, the latter being a silicate of zirconium.

A second outer packing 14, consisting of more finely divided fragments of zirconia, beryllia or even sand, fills the space between the cylinder 13 and the wall of the container 3 and functions as a heat insulator. A conduit 15, extending through the wall of the container 3, serves for the exhaust of the furnace.

Preliminary to the fusion of the silica charge in the zirconia crucible, the gaseous contents are exhausted from the container 3 which is hermetically sealed, the final vacuum preferably being as low as a few microns. A suitable heating current then is conducted through the carbon resistor to heat the crucible and its contents to the fusion temperature of silica. Gases evolved during fusion pass through the interstices in the gas-pervious packing 12 to the exhaust conduit. The resulting silica fusion may be allowed to cool and removed as an ingot, or, as described in connection with Figs. 3 and 4, tubes or rods of silica may be produced directly from the fusion.

The fusion furnace parts shown in Fig. 3 are, in general, the same as shown in Figs. 1 and 2, but there is shown in addition a core 17 supported from the bottom of the crucible 6. This core may be hollow and in that case communicates with an orifice 18 in the bottom of the furnace which during exhaust and fusion is covered by a removable plate 19. When fusion has been completed, the cover 4 (Fig. 1) is removed and a silica tube 20 is lowered into the silica fusion 21 where it is allowed to remain for a minute or so in order to unite with the fused silica. The tube 20 then is raised. It functions as a bait to withdraw some of the fused silica which is drawn over the core 17. The size of the resulting tube may be predetermined within limits by regulation of the pressure of internally applied gas through the orifice 18 and the duct through the core 17, and also by the rate of withdrawal of the bait 20.

Fig. 4 shows another apparatus of producing tubing from the silica fusion 21 without removing the cover 4 of the furnace. In this modification, a hollow core 22 is supported from the top of the crucible, the tip of the core registering with an orifice 23 in the bottom of the crucible 6. During fusion the orifice 23 is closed by a zirconia plug 24 which rests on the removable plate. Upon completion of the melt the plug 24 is removed and the valve 25 is turned by the handle 26 from its position, registering the vacuum line 27 (Fig. 6) with the conduit 15 to a position (Fig. 7) in which the gas pressure line 28 registers with the conduit 15. This forces the silica fusion through the orifice 23 and results in the extrusion of a silica tube 30. If desired, the size of the bore of such silica tube may be regulated by applying a suitable gas under pressure through the pipe 31 to the hollow core 22, or in any other suitable way.

The porosity of the zirconia packing is maintained during the fusion of the silica, and thereby permits exhaust of deleterious gases through its interstices. Zirconia does not begin to soften until it reaches a temperature of about 2600° C. It is capable, therefore, of reenforcing and supporting the walls of the crucible during the fusion of the silica. Preferably the evacuation of gases is continued during the melt, hence gases given off during fusion either by the charge, the carbon heater, or other parts, readily traverse the zirconia packing and reach the exhaust conduit. Surprisingly, the silica shows no signs of being modified by contact with zirconia even at the high temperature of fusion. The fusion product shows a clear boundary of demarcation when set from fusion in contact with zirconia. No striae or other optical defects are present in the product.

Although my improved fusion process has been described as applied to crystalline silica, it is equally applicable to the refusion of vitreous silica.

What I claim as new and desire to secure by Letters Patent of the United States is:

1. A silica fusion furnace comprising the combination of a sealed container, a crucible therein consisting of a material which is more refractory than silica and is inert with respect to fused silica, a closely circumjacent comminuted gas-pervious packing of a material chosen from the class consisting of zirconia and beryllia, an electric resistance heater of carbonaceous material embedded in said packing, and means for exhausting gas from the contents of said sealed container.

2. A furnace for fusing silica comprising the combination of a container constructed and arranged to be hermetically sealed, a carbonaceous resistance heater therein spaced to provide a fusion space, a screen consisting of a porous gas pervious mass of material chosen from the class consisting of zirconia and beryllia embedding said heater, a crucible consisting of such oxide in said fusion space, means for withdrawing gas from said fusion space through said mass of oxide and means cooperating with said crucible for fashioning tubular stock from a fusion of silica in said crucible.

3. A silica fusion furnace comprising the combination of a sealed container, a carbon resistance heater therein, a crucible of zirconia wherein silica may be fused, a screen consisting of fragments of zirconia interposed between said heater and said crucible, a support of zirconium silicate enclosing said screen, a heat-insulating packing of refractory material between said screen and said container and means for exhausting gas from the contents of said container.

4. A furnace which is suitable for fusing silica comprising the combination of a closed container, a fusion crucible therein consisting of material which is more refractory than silica and is inert with respect to fused silica, carbonaceous heating means external to said crucible and located in spaced relation thereto, a gas-pervious packing of comminuted refractory oxide filling the space between said crucible and said heater, said packing being substantially chemically inert with respect to carbon, and remaining substantially physically intact at the fusion temperature of silica, and means for exhausting gas from the contents of said container including said gas-pervious packing.

PHILIP K. DEVERS.